UNITED STATES PATENT OFFICE.

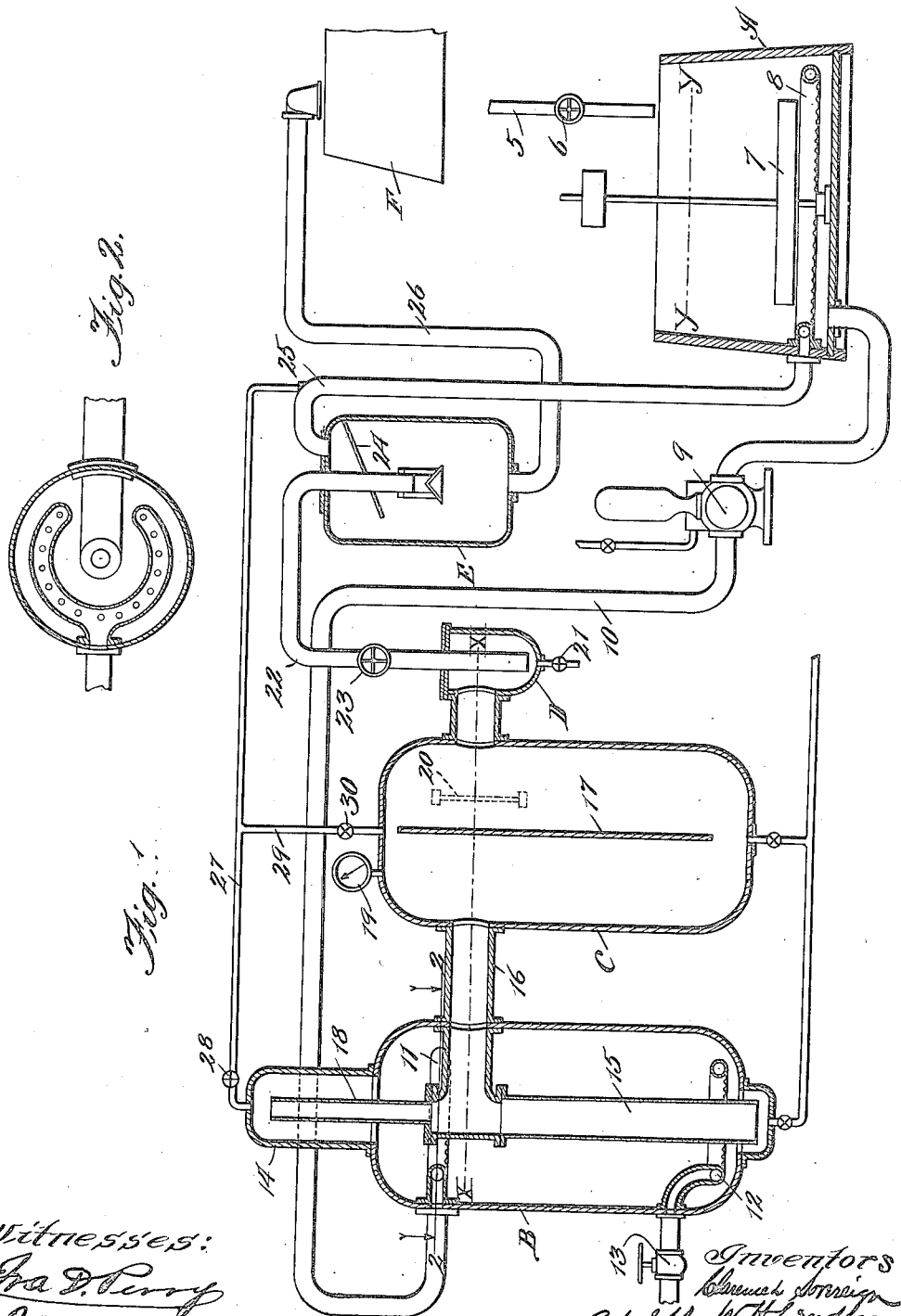

CLARENCE L. SOVEREIGN AND ADOLPH W. H. LENDERS, OF WAUKEGAN, ILLINOIS, ASSIGNORS TO CORN PRODUCTS REFINING COMPANY, A CORPORATION OF NEW JERSEY.

PROCESS OF CONVERTING STARCH INTO GLUCOSE OR ALLIED PRODUCTS.

1,183,408.     Specification of Letters Patent.     Patented May 16, 1916.

Application filed January 23, 1909. Serial No. 473,860.

*To all whom it may concern:*

Be it known that we, CLARENCE L. SOVEREIGN and ADOLPH W. H. LENDERS, citizens of the United States, residing at Waukegan, in the county of Lake and State of Illinois, have invented certain new and useful Improvements in Processes of Converting Starch into Glucose or Allied Products, of which the following is a specification.

Our invention relates to the conversion of starch into glucose, syrup, sugar or similar conversion products, and has for its object to provide a process of conversion which will give a better and more uniform grade of the product than is obtained by methods of conversion now in use, and which, at the same time, will lessen the cost of production.

According to the ordinary process of converting starch into glucose or the like, the starch is run in batches into a converting vessel, each batch being subjected to heat under pressure until a test shows that the proper degree of conversion has been reached. The contents of the converter is then blown up into the neutralizer and the converter refilled with a new batch of starch.

This process of conversion in batches is attended with several disadvantages. It is very difficult, even with constant care and attention, to maintain uniform conditions in converting the different batches so as to obtain uniformity of purity. Experience has shown that where, for instance, a conversion giving 40% of dextrose is required, this percentage often varies to the extent of 5% either way. Furthermore, this method of conversion interrupts the continuity of the manufacture as a whole and is particularly undesirable since the refining step, which follows the conversion, may be carried on by a continuous circulation of the crude glucose through the refining apparatus. A non-continuous process also involves the use of large storage tanks which, in a large factory, occupy very considerable space. In addition to all this, the process of conversion used to-day involves a very considerable waste of heat. During the time the starch liquor is being run into the converter, the steam vent of the converter is open and a large amount of steam escapes and is wasted. A further and more considerable loss of steam occurs when the liquor, having been subjected to heat for some time under pressure, is blown up to the neutralizer.

The object of our present invention is to provide a process of conversion which will do away with all of these disadvantages. In the first place, our process is a continuous, instead of an interrupted, process. In the second place, we utilize the steam escaping from the converter to give initial heating to the starch liquor before it goes to the converter.

In carrying out our process the starch, after being first heated to a certain extent by the steam saved from the converted liquor before it goes to the neutralizer, is caused to pass continuously through a plurality of connected converting vessels, in which it is heated, preferably under considerable pressure, the relation between the temperature and the rate of flow being such that the starch is converted to the desired degree by the time it has left the converters and without any interruption in the continuity of flow to or from or in the converters. From the converters the starch goes to an expansion chamber, and the vapor from this expansion chamber is utilized to give the initial heating to the inflowing stream of liquor. The converted liquor passes from the expansion chamber to the neutralizer, where the acid used to produce the conversion is neutralized in the ordinary manner.

In the accompanying drawings we have shown apparatus suitable for carrying out our process of continuous conversion, although it will be understood that this is for purposes of illustration merely, as the process might be practised by the use of different forms of apparatus.

In these drawings—Figure 1 is a longitudinal, sectional elevation; and Fig. 2 a sectional plan taken on line 2—2 of Fig. 1.

The starch is continually supplied to a tank A through pipe 5, being first mixed with a suitable acid water. An agitator 7 may be employed to thoroughly mix the liquor in tank A and to break up any lumps of starch. A steam ring 8 heats the liquor in the tank. From tank A the liquor is pumped by pump 9 through pipe 10 and perforated ring 11 into converting vessel B, the latter being provided, preferably at the bottom, with the steam ring 12, the supply of steam to which is controlled by valve 13. Preferably the vessel B has the steam dome 14. The liquor from the bottom of vessel B passes up through a pipe 15 and into a cross-pipe 16, which leads into the top of a second converting vessel C, which is preferably provided with the vertical partition 17 extending to within a short distance of the top and bottom of the vessel. A pipe 18, open at the end, extends from pipe 16 up into the steam dome 14 of vessel B. One of the vessels, vessel C as shown, may be provided with the steam gage 19 and water gage 20. Vessel C discharges into a blow-up pot D, having the test cock 21. A pipe 22, controlled by valve 23, leads from the bottom of the blow-up pot into expansion chamber E, the latter being provided with the baffle plate 24.

The liquor, it will be understood, is heated under considerable pressure in the converting vessels, in practice about forty pounds, although this pressure may be varied. The apparatus will be so designed that the pressure in the expansion chamber will be very small, for example, one pound. The liquor going from the high pressure to the low pressure gives up a great deal of vapor, which is separated in the expansion chamber, the vapor going to the steam ring 8 in vessel A through pipe 25, the converted liquor passing from the bottom of the expansion chamber to the neutralizer F through pipe 26. A steam pipe 27 leads from the steam dome of vessel B to pipe 25 and is provided with a valve 28. A pipe 29, having a valve 30, connects vessel C with pipe 27.

When the apparatus above described is started up, the priming water can first be heated in tank A and then pumped into vessel B. After this the starch mixed with the acid water, for example, a dilute hydrochloric acid, is heated and agitated in tank A and then pumped into vessel B until the desired level is reached, represented by line X—X. During this time the valves 28 and 30 are left open, giving a vent from the converting vessels. Steam is injected into the liquor in vessel B during the filling of the converters and escapes through pipes 27 and 29 into tank A, where it is utilized to heat the inflowing stream of liquor.

When the liquor in the converters has reached the normal operating level X—X, the process, by proper adjustment of the valves determined by testing at the test cock 21, will be carried on continuously. The acidulated starch is supplied to tank A, so as to maintain a desired level Y—Y in this tank. The pump is so timed as to introduce just enough of the liquor into the converters to maintain the right level so that the vapor spaces above the liquor line are in communication throughout the apparatus, and so as to give a rate of flow which will insure a proper degree of conversion in the liquor discharged into the expansion chamber. The steam supplied can also be regulated to give a proper temperature and pressure. Valves 28 and 30 may be closed or partly closed. The discharge valve 23 can be set to regulate the outflow from the converters. When a proper regulation of the flow of liquor, steam pressure and temperature has been brought about, the product must necessarily be uniform, since the conditions governing the conversion are uniform.

As a subsidiary, but important, feature of the process, the liquor, during the first part of its flow, is subjected to agitation. During the latter part of its course, the flow is quiet and unimpeded. The construction of the first converter should be such as to thoroughly agitate and mix the inflowing liquor. This we accomplish by introducing the liquor into the top of the converter in a body of hot steam and then causing a thorough boiling of the liquor in the vessel. In the second vessel there is nothing to disturb the flow, the object being to prevent the mixing of parts of the stream in different stages of conversion.

We have described the process of our invention with particular reference to the manufacture of what is commercially known as glucose. Obviously, it can be employed in the production of any of that group of sugars and syrups of which glucose is a member, and which are derived from starch of any sort by hydrolysis.

We do not intend by the use of the word "continuous" as describing the process that the introduction of the starch or the discharge of the product of conversion can never be interrupted. By describing the process as continuous, we mean that the glucose or other syrup is discharged, not in batches as has ordinarily been the case heretofore, but while the conversion of the unconverted starch in the converters is in progress; and that the fresh starch is similarly introduced, to make up for the discharged product without interrupting the conversion taking place in the converters.

We claim:

1. The process of converting starch into a saccharine product which consists in continuously introducing the starch mixed with an acid water into and causing the same to be passed through and discharged from closed containing means consisting of a plurality of connected vessels, maintaining the liquid in said vessels at such a level that the spaces in the same above the liquid therein are in communication with each other, and introducing steam into said containing means so as to heat the liquid therein and so as to maintain a pressure of steam above said liquid sufficient to effect the continuous discharge of the product of conversion from the last of said vessels.

2. The process of converting starch into a saccharine product which consists in continuously introducing the starch mixed with an acid water into and causing the same to be passed through and discharged from closed containing means consisting of a plurality of connected converting vessels, maintaining the liquid in said vessels at such a level that the spaces in the same above the liquid therein are in communication with each other, introducing the steam into the body of liquid in the first of said vessels so as to agitate the same and so as to maintain a pressure of steam in the vessels above the level of the liquid sufficient to effect the continuous discharge of the product of conversion from the last of said vessels.

3. The process of converting starch into a saccharine product which consists in introducing the starch mixed with an acid water into the upper part of the first of a series of closed connected vessels, maintaining the liquid in said vessels at such a level that the spaces in the same above the liquid therein are in communication with each other, withdrawing the liquid from the lower part of said first vessel and introducing it into the next vessel of said series, introducing steam into the lower part of said first vessel so as to heat the liquid in said vessels and maintaining a pressure of steam above the liquid therein, and by means of said pressure continuously discharging the product of conversion from the last of said series of vessels.

4. The process of converting starch into a saccharine product which consists in introducing the starch and an acid water into containing means consisting of a plurality of connected converting vessels, heating the same and maintaining a pressure above atmospheric pressure in said containing means, maintaining the liquid in said containing means at such a level that the spaces in the connected vessels above the liquids are in communication with each other, utilizing the pressure in said containing means for causing a flow of the liquid through said containing means, discharging the converted product from said containing means without interrupting the conversion of the unconverted or partially converted starch in said containing means, and introducing fresh starch into said containing means while such conversion and discharge of the converted product is taking place.

CLARENCE L. SOVEREIGN.
ADOLPH W. H. LENDERS.

Witnesses:
P. H. TRUMAN,
G. Y. SKINNER.